Sept. 12, 1967  J. ROSA  3,341,737
CONSTANT CURRENT SUPPLY ESPECIALLY FOR FLUORESCENT LAMPS
Filed Oct. 14, 1964  2 Sheets-Sheet 1
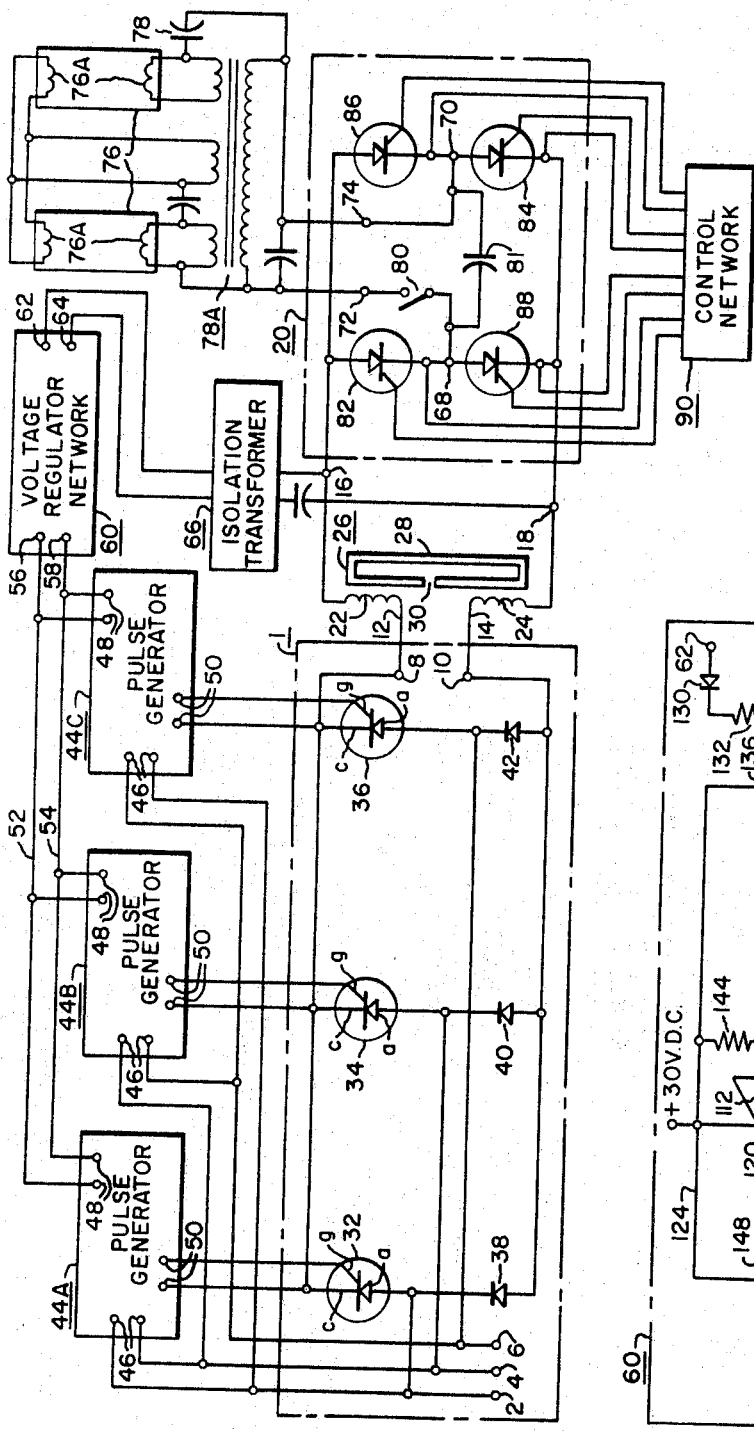
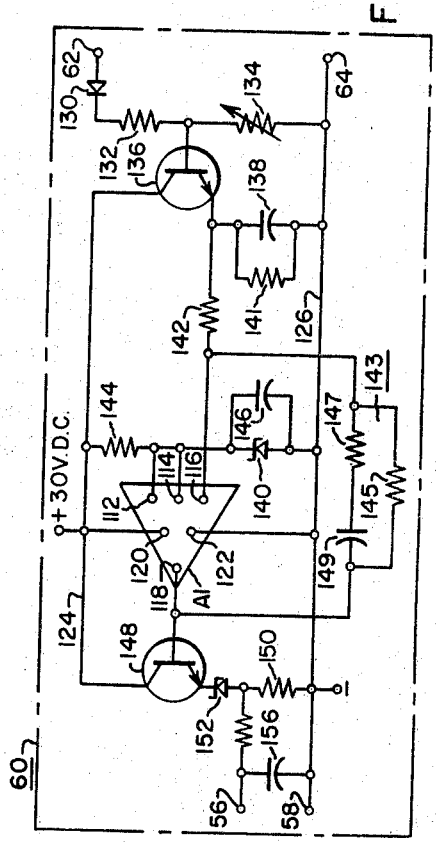
INVENTOR
John Rosa
BY
ATTORNEY

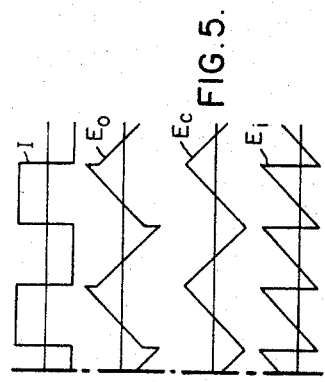
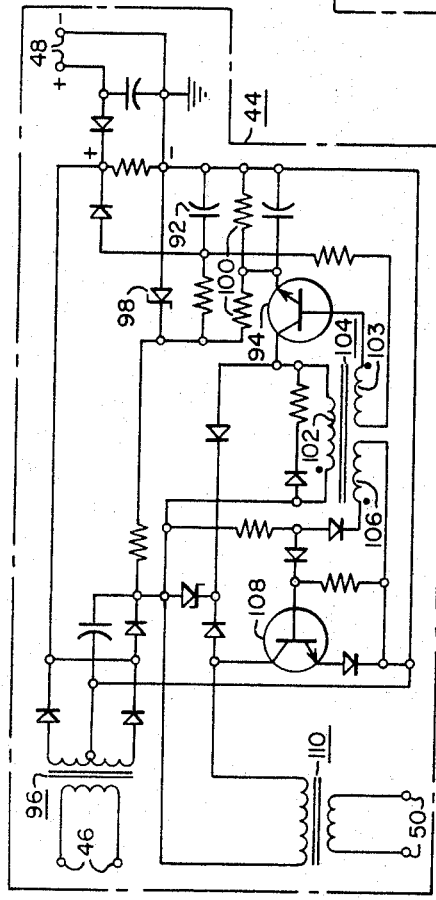
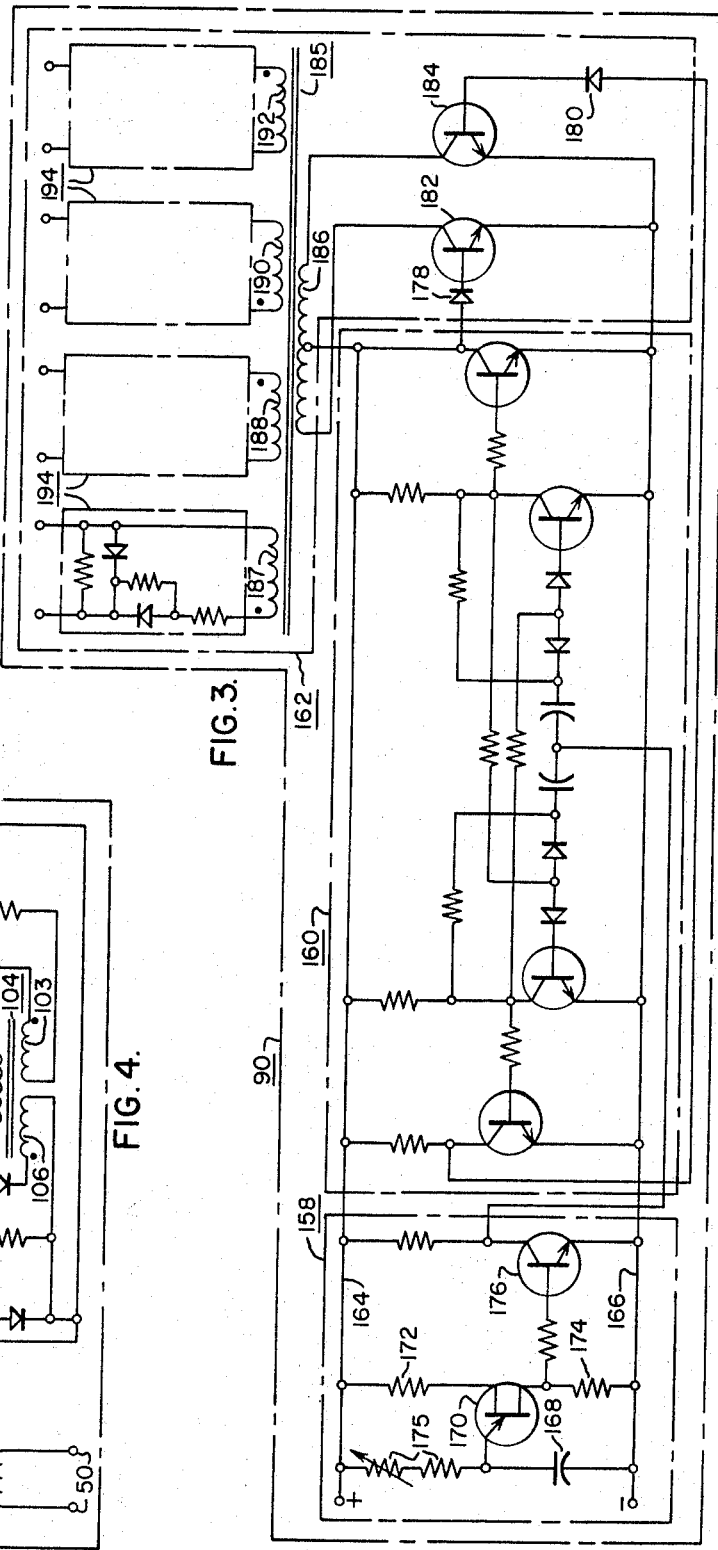

United States Patent Office 3,341,737
Patented Sept. 12, 1967

3,341,737
CONSTANT CURRENT SUPPLY ESPECIALLY FOR FLUORESCENT LAMPS
John Rosa, Pittsburgh, Pa., assignor to Westinghouse Electric Corporation, East Pittsburgh, Pa., a corporation of Pennsylvania
Filed Oct. 14, 1964, Ser. No. 403,815
9 Claims. (Cl. 315—194)

This invention relates generally to apparatus for energizing fluorescent lamps and more particularly to such an apparatus in which the magnitude of the potential applied to the lamp and ballast combination is accurately controlled.

An object of this invention is to provide an improved apparatus for supplying constant current to fluorescent lamps.

A further object of this invention is to provide such an apparatus in which the voltage sensing network is actuated at twice the frequency at which the energy is applied to the fluorescent lamp.

A still further object of this invention is to provide such an apparatus in which the voltage sensing means is energized from the potential at the input terminals to the inverting apparatus.

A still further object is to provide an output balanced about ground by the use of a split choke, half being in the positive D.C. rail, and half in the negative rail, as shown.

Other objects of this invention will be apparent from the description, the appended claims and the drawings, in which:

FIGURE 1 is a diagrammatic illustration of an apparatus for energizing fluorescent lamps and embodying the invention;

FIG. 2 is a schematic circuit showing a suitable voltage regulating network means which may be used to provide a control signal which controls the direct unidirectional input voltage;

FIG. 3 is a schematic diagram illustrating an apparatus for controlling the inverter network which supplies alternating current to the lamp;

FIG. 4 is a schematic diagram of the pulse generating network which controls the converter; and, FIG. 5 illustrates in graphic form certain voltage and current relationships of the apparatus.

Referring to the drawings by characters of reference the numeral 1 indicates generally a polyphase converter having input terminals 2, 4 and 6 for connection to a suitable source of polyphase input potential such as a normal 60-cycle utility supply. The converter 1 has a pair of unidirectional potential output terminals 8 and 10 connected by means of conductors 12 and 14 to input terminals 16 and 18 of a bridge type inverter or polarity reversing switch 20 through windings 22 and 24 respectively, of an inductance or choke 26 having an iron core 28 which preferably is provided with an air gap diagrammatically indicated at 30.

The converter 1 includes a plurality of discontinuous control type valves 32, 34 and 36 which may be silicon controlled rectifiers or transistors. Each of the valves 32, 34 and 36 is provided with a main current path which includes the anode $a$ and the cathode $c$ and a control circuit, for controlling the initiation of conduction through the main current path, which includes the gate $g$ and the cathode $c$. The main power or current paths of the valves 32, 34 and 36 are individually connected between the polyphase input terminals 2, 4 and 6 and the positive unidirectional potential output terminal 8. The negative unidirectional potential terminal 10 of the converter is connected through diodes 38, 40 and 42 to the polyphase power input terminals 2, 4 and 6.

Initiation of conduction of the valves 32, 34 and 36 is controlled by potential regulating means or networks comprising the firing pulse generators 44A, 44B and 44C respectively. The reference character 44 is sometimes used to designate these potential regulating networks when they are referred to generally. Each of these networks or firing pulse generators 44A, 44B and 44C is supplied with an alternating potential derived from the phase voltages of the polyphase potential supplied to the input terminals 2, 4 and 6. The firing pulse generators 44 are provided with direct current input terminals 48 and pulse energized output terminals 50. The output terminals 50 are pulsed at the frequency of the polyphase source and are connected to supply conducting pulses to the cathodes and gates of the valves 32, 34 and 36 as shown. The phase of the conducting pulses at terminals 50 with respect to the alternating potential at the terminals 46 is controlled by the magnitude of a unidirectional potential applied to the terminals 48.

The magnitude controlled direct current potential is supplied to the input terminals 48 of the generators 44A, 44B and 44C by conductors 52 and 54 energized from the output terminals 56 and 58 of a voltage regulating network 60. The network 60 has input terminals 62 and 64 connected through an isolation transformer 66 to the terminals 16 and 18 of the inverter 20 whereby the network 60 will be responsive to the peak value of the pulsating voltage supplied to the inverter or switch 20.

The inverter or switch 20 may take many forms. As illustrated, it is in the form of a bridge network having the input terminals 16 and 18 and output terminals 68 and 70 which connect to the input terminals 72 and 74 of a lighting load which comprises gaseous fluorescent lamps 76 with their main electrodes connected in series through a capacitive ballast 78 to the terminals 72 and 74. As illustrated two such lamps 76 are connected in series with a single ballast 78. The lamps are provided with diagrammatically illustrated electrodes 76A, electrically heated from a transformer 78A. Depending upon the output capabilities of the apparatus single lamps, series lamps and series parallel arrangements may be used as desired. A switch 80 may be used to turn one or more of the loads on and off as illumination is required. If desired, a capacitor 81 may be connected between the output terminals 68 and 70. The bridge network 20 includes the usual valve devices 82, 84, 86 and 88 in the bridge arms. These valve devices may take the form of discontinuous control type semiconductor devices such as silicon controlled rectifiers or transistors similar to the valves 32, 34 and 36. The pairs of devices 82–84 and 86–88 are alternately rendered conducting by a suitable control network 90 which provides an alternating potential control signal at the desired operating frequency. Since a current of constant magnitude flows through the inductance or choke 26, the switch 20 should not interrupt the current flow and it is preferable that the next-to-be-rendered-conducting pair of valves or devices be rendered conducting before the previously conducting pair of devices or valves are rendered non-conducting. The illustrated bridge network using discontinuous control type valves in which the conduction of the next-to-conduct pair of valves results in the extinguishing of the previous pair of valves is desirable.

A suitable firing pulse generator 44 is schematically illustrated in FIG. 4. The output voltage from the terminals 56 and 58 is applied to the input terminals 48 and maintains a voltage on a controlling capacitor 92 which determines the phase shift of the firing pulse with respect to the source voltage. More specifically this magnitude determines the time required to charge the capacitor 92 from its minimum charge, as determined by the voltage at terminals 48, to a critical potential which will cause the transistor 94 to initiate conduction. The increase in the charge on the capacitor 92 is provided by the pulsating full wave rectified voltage derived from the transformer 96 energized, as described above, from the polyphase source supplying the converter 1.

The magnitude of this pulsating charging voltage is regulated by a Zener diode 98. The breakover voltage of the diode 98 is sufficiently great to permit charging of the capacitor 92 to its critical potential. When the capacitor 92 reaches its critical charge, the blocking bias potential established by the voltage dividing resistor 100 is overcome and the transistor 94 conducts. The time interval required for the capacitor 92 to reach the critical potential (phase shift of the conducting pulse) will depend upon the initial charge on the capacitor 92 as determined by the potential supplied to terminals 48.

When the transistor 94 conducts, it energizes the primary winding 102 of a transformer 104 having a feedback winding 103 in the control circuit of the transistor 94. This causes the transistor 94 to oscillate at a frequency high with respect to the frequency of the polyphase voltage. The transformer 104 also has an output winding 106 which energizes the control circuit of an amplifying transistor 108. When so energized, the winding 106 causes the transistor 108 to conduct and energize the output transformer 110 to pulsatingly energize the output terminals 50 connected thereto. As indicated above, these firing pulses render conductive the one of the control valves 32, 34 and 36 with which it is associated.

It will be appreciated that the firing pulse generator 44 will provide phase shifted or delayed pulses for rendering the valves 32, 34 and 36 conducting at a controlled time relative to the polyphase potential voltage wave which delay or phase angle is dependent upon the magnitude of the regulating potential supplied to the terminals 48. The firing pulse generator per se forms no part of this invention and it should be definitely understood that any firing pulse generator which will provide an output signal at the output terminals 50 which is phase shifted with respect to the alternating current input voltage applied to the terminals 46 by a phase angle determined by the magnitude of the voltage applied to the input control terminals 48 may be utilized.

A voltage regulating network which may be used as the network 60 is schematically shown in FIG. 2. The network 60 includes an operational amplifier A1 of any usual type having input terminals 112, 114, and 116, an output terminal 118 and power input terminals 120 and 122. The input terminals 120 and 122 are connected respectively to a positive bus 124 and a negative bus 126 which are maintained at a desired potential difference, as for example 30 volts, from a suitable source of unidirectional potential.

The alternating control potential supplied to the input terminals 62 and 64 is rectified by a diode 130 and applied across a voltage dividing network comprising the resistors 132 and 134. One or both of the resistors 132 and 134 may be variable to adjust the relative magnitudes of the potential established across the resistors. The potential across the resistor 134 is applied between the base and emitter of an amplifying transistor 136 having its collector connected to the positive bus 124 and its emitter connected through a voltage establishing capacitor 138 to the negative bus 126. Preferably the resistors 132 and 134 are adjusted to provide that the capacitor 138 be charged to the breakover value of the reference Zener diode 140 when the peak value of the voltage at the terminals 16 and 18 is of the desired value. A bleeding resistor 141 is connected in shunt with the capacitor 138 to permit the capacitor voltage to follow changes in magnitude of the peak voltages. The elements 132, 134, 136, 138 and 141 form a sensing network which establishes a voltage across the capacitor 138 which is proportional to the peak value of the potential between the terminals 16 and 18.

The potential established across the capacitor 138 is applied, through a resistor 142, between the terminals 116 and 122 of the operational amplifier A1. The Zener diode 140 is connected in series with a voltage dropping resistor 144, between the buses 124 and 126. The common terminal between the Zener diode 140 and the resistor 144 is connected to the input terminals 112 and 114 which are strapped together. If desired, a capacitor 146 may be connected in shunt with the Zener diode 140 to stabilize the reference voltage. A feedback network 143 is connected between the input terminal 116 and output terminal 118 and includes a first resistor 145 shunted by a second resistor 147 connected in series with a capacitor 149. The gain of the amplifier is primarily determined by the relative values of the resistors 142 and 145.

The amplified output signal from the operational amplifier A1, derived from the terminals 118 and 122, is applied between the base and emitter of a buffer transistor 148 through a resistor 150 and a Zener diode 152. The transistor 148 has its collector connected to the positive bus 124 and its emitter connected through the Zener diode 152 and the resistor 150 to the negative bus 126 whereby the voltage across the resistor 150 and the output terminals 56 and 58 will be equal to the output voltage of the amplifier A1 less the voltage drop of the Zener diode 152. A suitable range in output voltages of the amplifier A1 would be from 5 to 25 volts. In such an instance the Zener diode 152 could be chosen to have a breakover voltage of 5 volts providing a 0-20-volt output of the terminals 56 and 58. If desired, a capacitor 156 may be connected between the output terminals 56 and 58 as illustrated for stabilizing the output voltage. The elements of the voltage regulating network 60 which are actuated by the voltage across the capacitor 138 to energize the conductors 52 and 58 form a control means which connects a sensing network (comprising the capacitor 138 and transistor 136) to the potential regulating means 44.

A suitable control network 90 for the valves 82, 84, 86 and 88 of the switch or inverter 20 is illustrated in FIG. 3. The network 90 comprises an oscillator and squarer portion 158, a flip-flop portion 160 and a drive portion 162. The control network 90 is energized from a suitable source of unidirectional potential energy which is applied between positive and negative buses 164 and 166 respectively. The portion 158 includes a capacitor 168 connected between the emitter and one of the bases of a unijunction transistor 170 through a resistor 174. The bases of transistor 170 are connected between the buses 164 and 166 through resistors 172 and 174. The capacitor 168 is connected between the buses 164 and 166 through a suitable current regulating impedance such as the illustrated resistor 175. The frequency of oscillation of the portion 158 is a function of time interval required for the capacitor 168 to reach a critical charge which causes the unijunction transistor 170 to conduct. When the transistor 170 conducts, it causes an amplifying and squaring transistor 176 to conduct. The change in potential resulting from its conduction of the transistor 176 is applied to flip the flip-flop or bistable multivibrator 160 from one to the other of its two stable operating conditions. The resulting reversal of the output potential applied by the flip-flop 160 through the diodes 178 and 180 to the bases and emitters of the current controlling transistors 182 and 184 reverses the energization of the output transformer 185. As illustrated the end taps of the primary winding 186 of output transformer 185 are connected through the transistors 182 and 184 to the bus 166. The center tap of the primary winding 186 is connected to the positive bus 164.

The alternating conduction of the transistors 182 and 184 induces an alternating voltage in the secondary windings 187, 188, 190, 192. These windings are respectively connected between the gate and cathode of the control valves 82, 84, 86 and 88 through pulse producing networks 194, one of which is illustrated in detail. The windings are polarized to produce conducting pulses for the valves 82 and 84 during one half cycle of the output potential of the transformer and conducting pulses for the valves 86 and 88 during the opposite half cycle.

It is believed that the remainder of the description may best be described by a description of the operation of the apparatus which is as follows: Electrical energy from the polyphase source is rectified in the polyphase converter 1 into unidirectional potential and is supplied from its output terminals 8 and 12 to the input terminals 16 and 18 of the reversing switch or inverter 20 through the inductance or choke 26. The inductance 26 is of such a large capacity that it will not saturate in the operating current range. The current therethrough therefore tends to remain of a fixed constant value whereby a constant value current is supplied to the lighting load.

Fluorescent lamps have a generally negative impedance characteristic and are normally connected in series with a current regulating ballast capacitor such as is illustrated in FIG. 1. With the proper value of the ballast capacitance 78 and of inductance 26 the rate of current flow through the load may be made substantially constant as illustrated by curve I of FIG. 5. At an operating frequency of the switch 20 of 3,600 cycles per second a suitable value of the ballast capacitor is 0.1 microfarad. The inductance can be a swinging choke having a 2 millisecond time constant. For a 20-kva. system an inductance of 4 mh. at 100 amps. swinging to 40 mh. at 10 amps. is suitable. If the current ripple of the source is filtered other than by the choke 26, less inductance may be used. As illustrated in curves $E_o$ and $E_i$, the voltage across the output terminals 68 and 70 and that across the input terminals 16 and 18 rises in a substantially straight line at a slope dependent upon the magnitude of the constant current flow. The curve $E_c$ represents the potential across the ballast capacitor 78.

The network 60 regulates the output voltage of the converter 1 and consequently the current I so that at the end of a predetermined time interval as determined by the unijunction relaxation oscillator 158, the switch will be reversed at the time the voltage $E_i$ reaches its predetermined peak magnitude. The reversal of the switch causes the relative polarity of output potential $E_o$ at the output terminals 68 and 70 to reverse. The potential $E_i$ abruptly falls and then rises to provide a double frequency potential $E_i$ through the isolating transformer 66 to the regulating network 60.

The potential proportional to the value of the peak potential attained at the input terminals 16 and 18 is supplied to the capacitor 138 of the voltage regulating network 60 (FIG. 2) and, as described above, this voltage is compared with the reference voltage across the Zener diode 140 to provide an output signal between the output terminals 56 and 58 which decreases below or increases above a predetermined voltage magnitude in inverse proportion to the increase or decrease of an error signal. This error signal is equal to the voltage difference between that across the capacitor 138 and that established by the Zener diode 140.

The output signal established at the terminals 56 and 58 is supplied to each of the firing pulse generators 44A, 44B and 44C and varies in value to phase shift the pulse applied to the valves 32, 34 and 36 so that the proper peak potential exists at the terminals 16 and 18 at the time switch 20 reverses the polarity of the potential supplied to the load. It will be appreciated that should the peak value increase or decrease for any reason the network 60 will change the phase shift of the firing pulses to provide for a firing of the control valves 32, 34 and 36 at a later or earlier time in the wave of the voltage applied thereto to alter the current flow through the inductance or choke 26 so that the desired magnitudes of the peak values of the voltage is maintained.

It will be noted that in accordance with this invention the frequency of the voltage applied to the voltage regulating network 60 is twice the output frequency applied to the fluorescent lamp load. This is because the voltage at the input terminals of the switch 20 goes through a complete cycle each time the switch 20 is reversed but two switch operations are required for a complete cycle of the lamps. This is advantageous since it reduces the ripple on the capacitor 138 to provide a more precise control of the output voltage of the converter 1 and the resulting more precise control of the lamp current. This precise control results in more stable and more satisfactory operation of the entire system.

Although the invention has been described with reference to a single embodiment thereof numerous modifications are possible and it is desired to cover all modifications falling within the spirit and scope of the invention.

What is claimed and is desired to be secured by United States Letters Patent is as follows:

1. In a lamp energizing network, a source of unidirectional electrical potential, potential regulating means connected to said source to control the magnitude of said unidirectional potential, an inductance, a polarity reversing switch having input and output terminals, circuit means connecting said source to said input terminals and including said inductance, a fluorescent lamp, a capacitor, circuit means connecting said lamp and said capacitor in series between said output terminals, said inductance having a sufficient magnitude relative to the magnitudes of said lamp and said capacitor to maintain a constant current flow therethrough, switch operating means connected to said polarity reversing switch and effective to actuate said switch to provide for energization of said output terminals from said input terminals in alternating polarity, a sensing network having input connections, means connecting said input connections to said input terminals, said sensing network being effective to provide a control potential proportional to the potential supplied to said input terminals, and control means interconnecting said sensing network and said potential regulating means, said control means being effective to actuate said potential regulating means to alter the magnitude of said unidirectional potential to maintain the peak value of the potential at said input terminals at a predetermined magnitude.

2. In combination, a source of adjustable magnitude unidirectional potential electrical energy, said source including voltage regulating means controlling the magnitude of said potential of the output energy of said source, said regulating means having a control circuit actuating said regulating means in response to the magnitude of the control signal applied thereto, a capacitor, a load device, a polarity reversing switching means, means connecting said capacitor in series with said device and said source through said switching means, cycling means actuating said switching means whereby said load device is connected in alternating polarity to said source, current regulating means maintaining a current flow of constant magnitude to said load, said regulating means comprising an inductance connected in series between said source and said switching means, and a voltage responsive error-sensor connected to said control circuit of said voltage regulating means to supply said signal thereto, means connecting said sensor to the input side of said switching means, said sensor being effective to alter the magnitude of said signal when the magnitude of the peak value of the voltage applied to said switch differs from a predetermined selected value, said alteration of said signal being in a direction to maintain the magnitude of said peak voltage at said selected value.

3. In a network, an inverting network having a pair of input terminals and a pair of output terminals, a gaseous lamp load, capacitive ballast, means connecting said load and said ballast in series circuit and said series circuit across said pair of output terminals, a source of variable potential unidirectional potential said source including control means determining the magnitude of its output potential, an inductance, means connecting said source to said pair of input terminals and including said inductance, a voltage sensing network having sensing terminals connected to said input terminals of said inverting network and having control terminals connected to said control means, said sensing network including means providing a control quantity having a magnitude which is proportioned to maintain a predetermined relation between a predetermined established reference magnitude and the magnitude of the peak potentials at said input terminals of said bridge network, said control means being responsive to changes in said control quantity to alter the magnitude of said unidirectional potential in a direction to maintain said peak magnitude at a substantially constant magnitude, and means actuating said inverting network to reverse the output potential at its said output terminals at a predetermined selected frequency whereby the magnitude of the current flowing in said load is maintained substantially constant.

4. In a network for energizing a load having a negative impedance characteristic comprising, a pair of load terminals, a pair of input terminals and a pair of output terminals, a capacitor, means connecting said load terminals to said output terminals through said capacitor, a plurality of discontinuous control type valves, each said valve having a power path and a control circuit controlling the initiating of current through its said power path, means connecting a first of said input terminals to a first of said output terminals for flow of current to said first output terminal and including said power path of a first of said valves, means connecting said first input terminal to the second of said output terminals for flow of current to said second output terminal and including said power path of a second of said valves, means connecting said second output terminal to the second of said input terminals for flow of current to said second input terminal and including said power path of a third of said valves, means connecting said first output terminal to said second input terminal for flow of current to said second input terminal and including said power path of a fourth of said valves, alternating potential power terminals adapted to be energized from a source of alternating potential electrical energy, a pair of unidirectional potential power terminals, an electrical energy rectifying network connecting said alternating potential power terminals to said unidirectional potential power terminals and including power control means, said power control means including control connections for initiating current flow therethrough, an inductance, circuit means connecting said unidirectional potential power terminals to said input terminals and including said inductance, frequency determining means connected to said control circuits of said valves and connected to render said power paths of said first and said third valve conducting and thereafter said power paths of said second and said fourth valves conducting for equal time intervals in endless sequence, a voltage regulator having an input circuit connected to said input terminals and an output circuit connected to said control connections of said power control means, said regulator including means to pulsatingly energize said control connections of said power control means with pulses of the same frequency as the frequency of the alternating potential at said power terminals, said regulator also including means effective to alter the phase of said pulses with respect to said alternating potential as a consequence of the existence of a difference in magnitude between the magnitude of the peak voltage applied to said input circuit and the magnitude of a reference voltage, said regulator acting to shift said phase in a direction to maintain said magnitude of said break voltage at a desired value.

5. In combination, a fluorescent lamp, a capacitor, a bridge inverter having input terminals and output terminals and means for reversing the polarity of its said output terminals with respect to its said input terminals, circuit means connecting said lamp and said capacitor in series circuit between said output terminals, a polyphase converter having power input terminals adapted to be energized from a source of polyphase electrical energy and having a pair of power output terminals, an inductance, circuit means connecting said power output terminals to said input terminals of said inverter and including said inductance, said converter including at least one discontinuous type control valve for each of said phases, each of said valves having a main current path and a control circuit for controlling the initiation of conduction of its said current path, said current paths of said valves being connected to complete current paths between said power input terminals and one of said power output terminals for flow of current between said power input terminals and said one power output terminal in a first direction, said converter including current conducting paths connecting the other of said power output terminals to said power input terminals for flow of current between said power input terminals and said other power output terminal in a second direction, a peak voltage sensing network having input connections, means connecting said input connections to said input terminals of said inverter, said peak sensing network having output connections and means for energizing its said output connections with a potential of a magnitude proportional to the magnitude of the peak potentials at input terminals of said inverter, a firing pulse generator individual to each of said phases of said converter, said pulse generators including firing circuit means energized from said polyphase source and connected to said control circuits of said valves to supply pulses thereto to initiate conduction through their respective said current paths in synchronizing with the operating frequency of said polyphase source, and network means connecting said peak sensing network and said firing pulse generator for varying the phase of said pulses to maintain the magnitude of said peak voltage at said input terminals to said inverter at a predetermined value.

6. The combination of claim 5 in which an isolating transformer is provided intermediate said input terminals of said inverter and said peak voltage sensing network, said network means which connects said peak sensing network to said firing circuit including an operational amplifier controlling the phase of said pulses.

7. The combination of claim 5 in which the said circuit means which is energized from said polyphase source includes phase shifting means for determining the phase of said pulses with respect to said polyphase potential, said phase shifting means including control means for varying said phase of said pulses, and the said network means which connects said peak sensing network to said firing circuit including said control means which varies said phase of said pulses.

8. In combination, a source of adjustable magnitude unidirectional potential electrical energy, said source including voltage regulating means controlling the magnitude of said potential of the output energy of said source, said regulating means having a control circuit actuating said regulating means in response to the magnitude of the control signal applied thereto, a capacitor, a load device, a polarity reversing switching means, means connecting said capacitor in series with said device and said source through said switching means, cycling means actuating said switching means whereby said load device is connected in alternating polarity to said source, current regulating means maintaining at any given rate of actuation of said cyling means a current flow of constant magnitude to said load, and a voltage responsive error-sensor connected to said control circuit of said voltage regulating means to supply said signal thereto, means connecting said sensor to said switching means, said sensor being effective to alter the magnitude of said signal when the magnitude of the peak value of the voltage at said switch differs from a predetermined selected value, said alteration of said signal being in a direction to maintain the magnitude of said peak value of the voltage applied at said switch at a selected value, and means to change the frequency of cycling of said cycling means.

9. In a network, a polarity reversing switch having a pair of input terminals connectable in alternating polarity to a pair of output terminals, an energy storage device, a gaseous discharge lamp device, a first apparatus for supplying power to a pair of power terminals, a first circuit connecting said discharge device and said storage device in series between said power terminals and including said pairs of terminals of said switch, said first apparatus being effective to supply power to said devices at selected substantially constant current magnitudes, said first apparatus including first means controlling the magnitude of said power which is supplied to said power terminals, a second apparatus connected to said reversing switch and effective to actuate said switch whereby said input terminals are sequentially connected to said output terminals in alternating polarity, said second apparatus including second means for reversing said switch, a feedback means connected to said circuit and responsive to the voltage of said circuit and effective to correlate the magnitude of said power with the reversing action of said switch such that said switch is effective to reverse the relative polarity of said input and output terminals at the same time that said voltage reaches a predetermined magnitude.

References Cited

UNITED STATES PATENTS

| | | | |
|---|---|---|---|
| 3,088,065 | 4/1963 | Manteuffel | 321—2 |
| 3,109,976 | 11/1963 | Sichling | 321—4 |
| 3,213,287 | 10/1965 | King | 307—88.5 |

JAMES D. KALLAM, *Primary Examiner.*

JOHN W. HUCKERT, *Examiner.*

J. D. CRAIG, *Assistant Examiner.*